United States Patent Office 3,634,476
Patented Jan. 11, 1972

3,634,476
METAL OXIDE ACYLATES AND THEIR
PREPARATION
Jacobus Rinse, 77 Anderson Road,
Bernardsville, N.J. 07924
No Drawing. Continuation-in-part of applications Ser. No. 651,120, July 5, 1967, Ser. No. 741,899, July 2, 1968, and Ser. No. 766,976, Oct. 11, 1968. This application July 7, 1969, Ser. No. 840,604
Int. Cl. C07l 15/00, 11/00, 1/08
U.S. Cl. 260—429
12 Claims

ABSTRACT OF THE DISCLOSURE

A process for preparing polyvalent metal acylates of non-volatile monocarboxylic acids containing at least seven carbon atoms by reacting said non-volatile acid with a metal acylate of a volatile acid, or said metal, metal oxide, hydroxide or carbonate admixed with said volatile acid and adding, at elevated temperature, a liberating agent for said volatile carboxylic acid.

RELATED APPLICATIONS

This application is a continuation-in-part of co-pending applications, Ser. No. 651,120, filed July 5, 1967, now Pat. No. 3,518,287 issued June 30, 1970; Ser. No. 741,899, filed July 2, 1968; and Ser. No. 766,976, filed Oct. 11, 1968, now Pat. No. 3,546,262.

BACKGROUND

Although aluminum and titanium alcoholates have been reacted with organic acids or with metal acylates to form corresponding metal-oxides-acylates (MOA), which are either (a) cyclic trimers $(OAlX)_3$, (b) cyclic tetramers $(X_4Ti_4O_6)$ or (c) linear compounds with di-, tri- and/or tetravalent atoms, such as

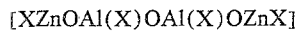

[XZnOAl(X)OAl(X)OZnX]

known processes are generally limited to metals which can form metal alcoholates or, as referred to by Turner et al. (U.S. Pat. 3,296,242), alkoxides or aryloxides, and/or fail to minimize any lower acyl substituent in the obtained product.

SUMMARY

An MOA of virtually any metal which has a valence number in excess of one can now be prepared. It is prepared from a metal, metal oxide, metal hydroxide or metal carbonate. One or more of these is reacted with a mixture of volatile (having from one to about five carbon atoms) and non-volatile (having at least seven, and preferably from 9 to 22, carbon atoms) monocarboxylic acids, the mole ratio of metal to non-volatile acid being at least 1:1. The reaction proceeds by heating the reactants until all of the metal or metal compounds has gone into solution. Then water and solvents are distilled off at temperatures from 100° to 250° C.

Instead of starting with one of the noted metals or organic compounds thereof, an acylate (of a volatile monocarboxylic acid, preferably formate or acetate) of a metal having a valence number of at least 2 (preferably 2 to 4) can be employed for this purpose. Such acylate is heated with a non-volatile carboxylic acid with the same ratio of metal to non-volatile acid as previously indicated and the remaining procedures effected as described. The metal acylate of a volatile monocarboxylic acid can, alternatively, be formed in situ and the non-volatile acid added directly thereto (without separation) to complete the reaction.

Chemically bound water of, e.g., metal acetates assists in the liberation of (in such case) acetic acid from the desired product (MOA). Such acetic acid is then distilled off. Water and/or steam is added during distillation to liberate lower alkanoic acid. In the absence of chemically bound water, a larger quantity of water must be added to promote said liberation. Virtually all acylate groups of volatile acids, e.g. formate and acetate groups, should be removed to produce MOA according to this invention because they adversely affect the properties of the end-products by increasing viscosity and melting points and decreasing solubility in organic solvents.

The acylate (A) of the MOA is thus an acylate of a non-volatile monocarboxylic acid. It is preferably aliphatic with a completely hydrocarbon rest, i.e., in an acid Y—COOH, Y is entirely hydrocarbon.

In addition to providing a method with an increased range of available starting materials, a further material contribution is the provision of a method for removing residual volatile acylate, e.g. acetate, groups from the produced metal oxide acylate. This is effected by one or a combination of the following steps:

(1) Add water or steam slowly during distillation at 100° to 250° C. Some metals, such as mercury and copper, require lower temperatures (100° to 150° C.) than others, such as iron and chromium. [The addition of water or steam is halted when no more acetic (or other lower alkanoic volatile) acid is noticeable in the distillate.]

(2) Add a volatile alcohol, such as a lower alkanol, e.g. isopropanol and butanol, during the distillation (in lieu of or in addition to water or steam). The volatile alcohol reacts with residual volatile acylate, e.g. acetate, groups (yielding volatile ester) and couples the metal atoms by oxygen bonds.

(3) Add a small amount, e.g. from 1 to 10 percent by weight (based on the total weight of MOA) of aluminum alcoholate, titanium alcoholate or condensed titanium silicon alkoxide. [The alcoholate or alkoxide is, e.g., isopropoxide or butoxide.] More than 10 percent by weight, e.g. up to 25 percent by weight, is needed for antimony and bismuth oxide acylates, which are non-drying liquids. Otherwise, 10 percent or less is adequate to eliminate residual lower acylate, e.g. acetate, and any excess thereover causes undesirable alkoxy in the final product. Silicon alkoxide delays or prevents drying, while aluminum alkoxide hydrolyzes in air; both effects are undesirable in most cases.

Scheme 1 is preferred. The reaction temperature for schemes 2 and 3 is at least 150° C. and preferably from 170° to 200° C. Sometimes, as is the case with ferrous oxide tallate, water and alcohol are added alternatively to prevent solidification of the batch. Scheme 3 leads to a different product than schemes 1 and 2, but such product is closely analogous. The products of Scheme 3 can be maintained in liquid state at room temperature, whereas the products of schemes 1 and 2 are ordinarily solids (under the same conditions) which readily dissolve in such solvents as mineral spirits, turpentine and xylene.

A further aspect of the invention concerns the molar ratio of metal to non-volatile monocarboxylic acid. As said ratio is increased above 1:1, e.g. to 2:1 or 3:1, finely divided metal oxide is formed in situ in the product. Said finely divided metal oxide is in such a minute state of subdivision that it does not settle, but remains dispersed in the MOA, producing a fine paint with a high metal content without having to grind or to mill the pigment.

DETAILS

The metal which forms an integral part of the MOA must exist in the MOA in a form which has a valence number in excess of one. Said metal is an element or a plurality of elements. When more than one metal is employed in the preparation of the MOA, the selected metals may, but need not, have the same valence numbers.

The metal is, e.g., calcium [II], magnesium [II], strontium [II], barium [II], zinc [II], cadmium [II], nickel [II], mercury [II], iron [II] or [III], chromium [II] or [III], manganese [II] or [III], cobalt [II], aluminum [III], antimony [III], zirconium [IV], bismuth [III], cerium [III], titanium [IV], tin [II] or [IV] or lead [II] or [IV]. [Illustrative valence numbers of each of the enumerated metals in MOA are indicated in brackets following the respective metals.]

In order to prepare MOA according to this invention the metal itself can be employed as a suitable starting material. When so employed, it is preferred to have the metal in a finely divided state, such as in powder form. Iron powder, e.g., can be refluxed with aqueous acetic acid and the product reacted with tall oil fatty acids to produce ferrous oxide tallate.

The starting materials is, alternatively, a metal compound, such as a metal oxide, e.g. chromium trioxide [$CrO_3$] and lead oxide [$PbO$], a metal hydroxide, e.g. calcium hydroxide [$Ca(OH)_2$] and a aluminum hydroxide [$Al(OH)_3$], a metal carbonate, e.g. manganese carbonate [$MnCO_3$] and lead carbonate [$PbCO_3$], or a metal acetate, e.g. basic iron acetate $$[Fe(OH)(OOCCH_3)_2]$$

and titanium tetraacetate [$Ti(OOCCH_3)_4$].

The volatile carboxylic acids include propionic acid and butyric acid, but formic acid and acetic acid (particularly the latter) are preferred. The non-volatile monocarboxylic acids include such aliphatic acids as straight chain acids, e.g. stearic acid; branched chain acids, e.g. 2-ethylhexoic acid; saturated acids, e.g. palmitic acid; and unsaturated acids, e.g. oleic acid and linoleic acid; such cycloaliphatic acids as naphthenic acids, e.g. cyclopentanecarboxylic acid; and such aromatic acids as rosin (abietic acid). p-Toluene sulphonic acid can be similarly used even though it is not a carboxylic acid. Since it is desired to obtain liquid products or low melting point solids, virtually the only limitation on the non-volatile monocarboxylic acid is that the MOA obtained therewith be fluid, or be readily soluble in paint or varnish solvents, e.g. mineral spirits, xylene or turpentine, to form compositions having a paint-like or more fluid consistency. The non-volatile carboxylic acid need not be a single acid, but can be a mixture of such acids, such as "Neo-Fat" products ("Neo-Fat" No. 1–56, "Neo-Fat" No. 1–54, "Neo-Fat" No. 1–60, "Neo-Fat" No. 3–R, "Neo-Fat" No. 11, "Neo-Fat" No. 17 and "Neo-Fat" S–142), coconut oil fatty acids and tall oil fatty acids.

In the preparation of MOA, up to 50 (mol) percent of the non-volatile monocarboxylic (fatty) acid is replaceable by a phenol. The phenol may be either unsubstituted phenol or substituted phenol, e.g. o-, m- or p-cresol, pentachlorophenol and phenylphenol. Although naphthols, e.g. β-naphthol, can be used for this purpose, the preferred phenols are free from condensed rings.

All of the products according to this invention are liquids or relatively low melting solids that form liquid compositions; these liquids and liquid compositions can be converted into hard, heat-stable, adherent protective coatings on both metal and non-metal surfaces. Said products are low in cost; protective coatings prepared from the colored MOA do not bleach and are light-fast. The color is permanent in those products which are colored. These properties are inherent in the products without having to combine them with resins or other polymers or condensates. Color and binder are chemically combined. Said products also include stabilizers and catalysts.

Some MOA, such as those of zinc, lead, aluminum, antimony, titanium, zirconium and mercury, are nearly colorless; others, such as those of ferric iron (brown), ferrous iron (black), copper (green), chromium (green), nickel (green), and manganese [III] (brown), have color.

The removal of acylate (from volatile monocarboxylic acid) groups from produced metal oxde acylate was a problem. As these groups increase the viscosity and the melting point of the metal oxide acylate, their presence is a detriment to the product. Although complete removal of such lower acylate groups is not possible when metals such as zinc and lead are employed, i.e., without precipitation of insoluble metal oxides, practically all of said lower acylate is removed from most MOA by the process of the subject invention. Other metals, such as iron and chromium, are completely separated from lower acylate, e.g. acetate, groups by the methods herein taught. Even for lead and zinc oxide acylates at least 55 mol percent of the acylate groups are those of non-volatile monocarboxylic acid.

For the formation of the MOA and the removal of lower acylate no solvent is required, e.g., when the metal is lead or zinc; the presence of other metals, however, may necessitate limited quantities of a solvent, such as mineral spirits (boiling point range 150° to 170° C.), turpentine or xylene (o-, m-, p-, or any mixture thereof), to maintain the MOA in a liquid state during distillation. However, as soon as most of the volatile acid has been removed, all MOA are liquids (indicating the absence of hydrogen bonds and the virtual absence of low molecular acylates) or are readily soluble in hydrocarbon solvents to form liquid compositions.

Using M to designate a divalent metal element; M', a trivalent metal element; and M", a tetravalent metal element, typical reaction schemes follow:

(I)

$MCO_3 + 2CH_3COOH \rightarrow M(OOCCH_3)_2 + H_2O + CO_2$
$MO + 2CH_3COOH \rightarrow M(OOCCH_3)_2 + H_2O$
$M(OH)_2 + 2CH_3COOH \rightarrow M(OOCCH_3)_2 + 2H_2O$
$M + 2CH_3COOH \rightarrow M(OOCCH_3)_2 + H_2$
$M(OOCCH_3)_2 + HX \rightarrow XMOOCCH_3 + CH_3COOH$
$XMOOCCH_3 + H_2O \rightarrow XMOH + CH_3COOH$
$2XMOH \rightarrow XMOMX + H_2O$ (II)

$M'_2(CO_3)_3 + 4CH_3COOH \rightarrow$
$\qquad 2M'(OH)(OOCCH_3)_2 + 3CO_2 + H_2O$
$M'_2O_3 + 4CH_3COOH \rightarrow 2M'(OH)(OOCCH_3)_2 + H_2O$
$M'(OH)_3 + 2CH_3COOH \rightarrow M'(OH)(OOCCH_3)_2 + 2H_2O$
$2M' + 4CH_3COOH + 2H_2O \rightarrow$
$\qquad 2M'(OH)(OOCCH_3)_2 + 3H_2$
$HOM'(OOCCH_3)_2 + HX \rightarrow$
$\qquad HOM'(X)OOCCH_3 + CH_3COOH$
$3HOM'(X)OOCCH_3 \rightarrow (OM'X)_3 + 3CH_3COOH$ (III)

$4M''(OOCCH_3)_4 + 4HX + 6H_2O \rightarrow$
$\qquad X_4M''_4O_6 + 16CH_3COOH$ (IV)

$2XMOM'(OR)OMX \rightarrow [(XMO)_2M']_2O + ROR$ wherein

X is acyl of a non-volatile monocarboxylic (preferably aliphatic) acid;

R is either a hydrogen atom, lower alkyl, e.g. isopropyl, or lower acyl, e.g. acetyl.

In the preceding reaction schemes each M, M' or M" can represent a plurality of metal elements having the same valence number. Acetic acid is used solely as an exemplary volatile monocarboxylic acid. The list of reactions is not exhaustive and is not intended to be; it is merely illustrative. Other combinations, e.g. with tetra- and divalent metals [$XMOM''(X_2)OMX$] and with tetraand trivalent metals [X₂M'OM"(X₂)OM'X₂], are also within the scope of the subject invention.

Wherever the mol ratio of metal to non-volatile acyl is ordinarily 1:1 and it is advantageous to obtain a product with a higher metal content, e.g. for paints, said mol ratio can be increased to 2:1, 3:1 or even higher. The reactions proceed in the same manner to yield MOA of the same formulae, but the excess metal is highly dispersed in the MOA as metal oxide particles of such fineness that they do not settle; coatings prepared from MOA having such excess metal content dry to a high gloss. Like principles are applicable to other mol ratios. Increasing the molar ratio of metal to non-volatile acylate thus results in a simple method of preparaing paints without griding. Such a product from copper, e.g. cupric oxide tallate [TCuOCut] having cuprous oxide dispersed therein, is useful as an anti-fouling paint. When an excess of iron is employed in the preparation of ferric oxide tallate [(OFeT)₃], a red-brown paint is obtained; this paint adheres strongly to aluminum metal, in particular, flakes forming an imitation gold paint.

Those products wherein some of the non-volatile acid is replaced by phenol, particularly MOA wherein the metal is iron, are useful as tains and preservatives for wood.

MOA reacts with organic acids, such as mono- and dicarboxylic acids, e.g. maleic and acetic acids, to form solids. Those MOA which are colored are dyes. MOA reacts with inorganic acids, e.g. sulfuric acid, to form soaps and is thus useful as an acid-binding agent; it reacts with alcohols and form solutions; it reacts with phenols, e.g. pentachlorophenol, to form products which are useful for, e.g., fungicides; and it reacts with sulfur to form products which are useful for, e.g., preparing high-viscosity polymers.

The preparation of relatively inexpensive imitation gold paint or ink is another facet of the subject invention. This is accomplished, e.g., by admixing ferric oxide tallate [(OFeT)₃], such as that obtained according to Example 20, with aluminum flake, preferably a product with a monomolecular layer of stearic acid on the aluminum flake as is commercially available. The aluminum flake is employed in its marketed form, the stearic acid contributing materially to the value of the paint product.

The following examples illustrate representative embodiments of the subject invention and include both products and the manner in which said products are prepared. However, it is to be understood that the examples are intended solely for the purpose of illustration and in no way limit the scope of the invention which is defined in appended claims.

EXAMPLE 1

Mix 284 grams (g.) titanium tetraisopropoxide (TPT) with 300 g. of condensed ethylsilicate 40 (containing 40% $SiO_2$). The temperature rises 20° C., and a clear stable, colorless liquid, which does not form an insoluble skin or crust in the neck of the container results. This liquid is a compound of the formula:

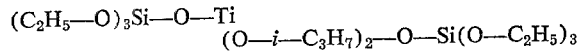
$(C_2H_5-O)_3Si-O-Ti$
$(O-i-C_3H_7)_2-O-Si(O-C_2H_5)_3$

EXAMPLE 2

Mix 284 g. of TPT with 250 g. of tetrameric silicon oxide butoxide $[(C_4H_9-O)_4Si_4O_6]$ and promptly heat the resultant to 120° C. to obtain a clear liquid reaction product having a cyclic structure, such as:

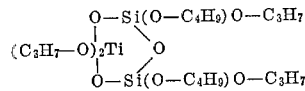

The clear liquid is a colorless condensate which dries in air to a smooth coating and has greater stability with respect to temperature and hydrolysis than the reactants from which it is prepared. The condensate is useful as primers for protective coatings or as adhesion coatings for solid substrates.

Heating to 50° C. results in a similar condensate.

EXAMPLE 3

Mix 568 g. of TPT with 150 g. of condensed ethylsilicate and promptly heat the resultant to 100° C. There is thus obtained a liquid oligomer of titanium and silicon wherein each silicon atom is linked to a titanium atom through an oxygen bridge. The liquid oligomer has a lower rate of hydroylsis than TPT and is useful as a catalyst in the preparation of silicon oxide alkoxide oligomers.

EXAMPLE 4

Mix 568 g. of TPT with 150 g. of regular ortho-ethyl silicate. Drop water slowly into the admixture while heating same to a temperature of from 100° to 120° C. to obtain a condensate which is an oligomer of silicon and titanium wherein each atom of silicon is bonded to a titanium atom through an oxygen bridge.

EXAMPLE 5

Mix 182 g. of condensed TPT with 208 g. of ortho-ethylsilicate. Heat the resultant to a temperature of from 100° to 120° C. to obtain a condensate having a structure with alternating —SiO— and —TiO-groupings.

The condensed TPT is prepared by mixing water with TPT and heating the resultant as a temperature of from 100° to 120° C. according to the reaction scheme:

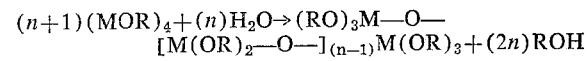
$(n+1)(MOR)_4 + (n)H_2O \rightarrow (RO)_3M-O-$
$[M(OR)_2-O-]_{(n-1)}M(OR)_3 + (2n)ROH$ where
M is titanium,
R is isopropyl, and
n is the number of moles of water reacted with (n+1) moles of titanium alkoxide.

EXAMPLE 6

Heat a mixture of 145 g. of titanium oxide butoxide $[(C_4H_9O)_4Ti_4O_6$ prepared according to the disclosure of U.S. Pat. 3,087,949] and 206 g. of silicon tetraethoxide (B.P. 165° C.) to 50° C. to obtain a colorless liquid which can be heated to 200° C. without decomposition or distillation. The colorless liquid is comprised of compounds which are silicon/titanium oxide esters wherein silicon and titanium atoms are linked only through oxygen bridges. Cyclic oligomers, primarily tetrameric, predominate although some linear oligomer is present.

EXAMPLE 7

Heat an admixture of 30 grams (g.) of antimony triacetate, 56 g. of tall oil fatty acid and 10 g. of mineral spirits to 200° C. Apply a vacuum (5 mm. Hg) to the resultant and allow the temperature to be lowered to 130° C., at which point add thereto 12 g. of the product of Example 1 before raising the temperature to 170° C. Distill off ethyl and isopropyl acetates slowly. Apply a vacuum. There is thus obtained a clear light brown liquid which is useful as a catalyst for the preparation of urethane resins.

EXAMPLE 8

Heat a mixture of 30 g. of antimony triacetate and 56 g. of tall oil fatty acid to 210° C. and apply a vacuum to the resultant. After cooling same to 100° C., add thereto 12 g. of a mixture of equal parts by weight (p.b.w.) of titanium isopropoxide (TPT) and condensed ethylsilicate before heating again to 190° C. A liquid oil is thus obtained.

EXAMPLE 9

Reflux 25.5 g. of bismuth carbonate [$Bi_2O_2CO_3$] with 40 g. of acetic anhydride. Add thereto 36 g. of ethylhexoic acid, and raise the temperature of the resultant to 210° C. before applying a vacuum. Cool the reaction mixture to 100 C., and then add thereto 20 g. of the product of Example 1. Raise the temperature to 130° C. for ten minutes and then apply a vacuum. Distill off a mixture of ethanol and isopropanol. The residue is a clear brown liquid.

EXAMPLE 10

Heat a mixture of 40.6 g. of bismuth triacetate and 56 g. of tall oil fatty acid to 210° C. and apply a vacuum to the resultant. After cooling same to 100° C., add thereto 12 g. of a mixture of equal parts by weight (p.b.w.) of titanium isopropoxide and condensed ethylsilicate before heating again to 190° C. A dark colored liquid is thus obtained.

EXAMPLE 11

Dissolve 20 g. of zinc oxide [ZnO] in a mixture of 43 g. of ethylhexoic acid and 6 g. of acetic acid. Heat the resulting admixture to 220° C. and apply a vacuum thereto. Heat to 150° C. before adding thereto 5 g. of the product of Example 1. Thereafter further heat to a temperature of from 170° to 180° C. for 40 minutes and apply a vacuum again to obtain a viscous liquid.

EXAMPLE 12

Heat a mixture of 28.6 g. of basic ferric acetate, 24.3 g. of zinc oxide [ZnO], and 84 g. of tall oil fatty acid to 200° C. and, after subjecting the resultant to a vacuum, add thereto 10 g. of the silicon titanate product of Example 1. Thereafter apply a vacuum again to obtain a clear dark brown liquid which is useful as a preservative stain for lumber.

Replacing the product of Example 1 with an equivalent of each of the products of Examples 2 through 6 results in the preparation, in similar manner, of a liquid which is likewise useful as a preservative for lumber.

EXAMPLE 13

Dissolve 25.5 g. of barium acetate in 40 g. of water at 100° C. and, add 74 g. of ethylhexoic acid to the resulting solution before heating same to 200° C. At the latter temperature add 12.6 g. of bismuth carbonate and maintain for 30 minutes, whereupon the resulting batch becomes clear. Apply a vacuum and cool to 110° C. before adding thereto 9 g. of the product of Example 1. Thereafter heat to 130° C. and apply a vacuum to remove liberated alcohols. There is thus obtained 117 g. of a viscous clear oil which is useful as a stabilizer for plastics, e.g. vinyls, against heat.

The products of Examples 7 to 13 are liquids which are useful as protective coatings for solid substrates, e.g. wood. They are also useful as intermediates for paint driers, stains, catalysts, stabilizers and preservatives.

EXAMPLE 14

Heat a mixture of 84 g. of isostearic acid and 12 g. of acetic acid to 50° C. prior to adding 12.8 g. of cadmium oxide and 8.1 g. of zinc oxide [ZnO] thereto. Raise the temperature of the resultant to 140° C., at which temperature clarification takes place. Thereafter add 14.8 g. of aluminum formo-acetate thereto; this also goes into solution at the latter temperature. Raise the temperature to 200° C. and add 20 g. of wate thereto. Then apply a vacuum. The clear liquid which remains solidifies below 100° C. The composition is of the formula XZnOAl(X)OCdX and is a stabilizer for plastics.

EXAMPLE 15

Heat a mixture of 56 g. of tall oil fatty acids, 6 g. of acetic acid and 14.9 of aluminum formo-acetate to 50° C., and add thereto 44.6 g. of litharge and 15 g. of mineral spirits. The resulting batch clarifies on heating same to 100° C. Add 30 g. of butanol at that temperature and continue heating to 235° C. before applying a vacuum. A greyish product is obtained which is a solid at 50° C. Said product is a mixtue of compounds of the formulae:

(TPbO)$_2$AlOAl(OPbT)$_2$ and TPbOAl(X')OPbT wherein T is tall oil fatty acid radical and X' is acetoxy.

EXAMPLE 16

At 60° C. mix 114 g. of an isopropanolic solution of titanium acetate (containing 9.6 g. of titanium) with 53 g. of stearic acid. Distill the resultant. At 150° C. drop 10 g. of water into the distillant slowly in order to remove residual acetate groups. Apply a vacuum (5 mm. Hg) at 180° C. A wax which is clearly soluble in hexane and which has a melting point of 40° C. is thus obtained. The wax is useful for waterproofing.

EXAMPLE 17

Distill a mixture of 83 g. of a butanolic solution of tin tetraacetate (23.6 g. of tin) and 30 g. of ethylhexoic acid. Drop 5 g. of water slowly into the distilland at 130° C. Apply a vacuum at 180° C. There is thus obtained a viscous liquid which is useful as a catalyst for the preparation of urethane foams.

EXAMPLE 18

Heat 150 g. of an isopropanolic solution of zirconium acetate (18.2 g. of zirconium) with 56 g. of oleic acid and 60 g. of mineral spirits. While maintaining at 200° C., drop water into the batch until it begins to become turbid (about 50 g.). Apply a vacuum and continue heating until a temperature of 260° C. is reached. A light brown solid product, which is soluble in xylene, is thus obtained. The product is useful as a drier for oil paints.

EXAMPLE 19

Heat a mixture of 38.2 g. of basic iron acetate, 11 g. of mixed p- and m-cresol and 28 g. of tall oil fatty acids in a period of 30 minutes to 220° to 230° C. Then drop 25 g. of water slowly into the resultant at that temperature. Apply a vacuum. A hard dark brown resin, which is soluble in either xylene or butanol, is thus obtained. Resulting solutions dry in thin layers to high-gloss coatings. The product is useful as a preservative for wood and has a greatly reduced evaporation rate in view of the incorporated phenol.

EXAMPLE 20

Heat 38.2 g. of basic iron acetate [HOFe(OOCCH$_3$)$_2$] with 28 g. of tall oil fatty acid to a temperature of 220° C. Then drop 25 g. of water slowly into the resultant at that temperature. Apply a vacuum. There is thus obtained a reddish brown resinous mass which, upon addition thereto of 30 g. of either mineral spirits of turpentine, yields a bright brown paint which dries to a hard glossy coating. The ferric oxide tallate produced has the formula (OFeT)$_3$.

Replacing the basic iron acetate with 40 g. of cupric acetate and otherwise following the identical procedure yields cuprous oxide dispersed in cooper oxide tallate (TCuOCuT) which, upon dissolving in one of the noted solvents, is useful as a rapid drying brown anti-fouling paint.

Copper oxide tallate is an interesting material. When prepared below 150° C., it is green and dries slowly to a clear green film; but when prepared at 200° C., it is brown and dries rapidly to a clear green coating. If excess copper is used and the product contains Cu$_2$O, its color is brown and it dries to a brown coating.

EXAMPLE 21

Heat a mixture of 56 g. of tall oil fatty acids, 24 g. of acetic acid, 40 g. of mineral spirits or xylene and 41.2 g. of cupric hydroxide [Cu(OH)$_2$] to 140° C. Drop 100 g. of water slowly into said mixture while maintaining the stated temperature. Then heat further to 190° C. [Intermittently mineral spirits and xylene (a total of about 30 g. of each) are added to maintain the mixture in the liquid state and for the reduction of cupric oxide to cuprous oxide. The color of the batch, which was initially green, turns brown.]

Continue heating of 230° C. Apply a vacuum at the latter temperature until distillation stops. A brown xylene-soluble solid is thus obtained. Xylene solutions of said solid dry in air to dichromatic coatings with good gloss and are useful as anti-fouling paint for ship bottoms.

EXAMPLE 22

Reflux 22.4 g. of iron powder with 80 g. of acetic and 80 g. of water until no more hydrogen comes off. Distil off water and excess acid while slowly adding 40 g. of mineral spirits and 56 g. of tall oil fatty acids to the distilland, which forms a deep black solution. While maintaining the temperature at 200° C., add 100 g. of water and 10 g. of isopropanol to the distilland to remove residual acetate groups. Apply a vacuum to the resultant at 220° C. A black solid is thus obtained. Said solid (84 g.) dissolves in 30 g. of xylene and 10 g. of butanol to form a black paint which dries to a high gloss and is suitable as an anti-corrosive. The suspended iron oxide does not settle during a storage.

EXAMPLE 23

Heat 14.8 g. of aluminum acetate-formate

[HCOOAl(OH)OOCH₃] 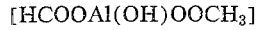

together with 16.2 of zinc oxide and 50 g. of water. After 5 g. of water have been distilled off, add 53 g. of stearic acid and 30 g. of mineral spirts to the resultant and continue heating to 180° C., at which temperature the batch becomes clear. While maintaining the temperature, add 10 g. of water slowly to said batch. Heat further to 200° C. and apply a vacuum at the latter temperature. The compound of the formula $(XZnO)_2AlOAl(OZnX)_2$ is thus obtained [X is stearate]. This compound is useful as a rubber compounding additive.

EXAMPLE 24

Heat 24.5 g. of crystalline manganese acetate with 3.9 g. of freshly prepared aluminum hydroxide and 60 g. of mineral spirits. At 130° C. add thereto 28 g. of stearic acid. Add a further 14 g. of stearic acid thereto at 175° C. Thereafter add 50 g. of hydrocarbon solvent Isopar M. The batch becomes clear at 200° C. and gradually liquefies at 230° C. Add 10 g. of water and apply a vacuum thereto. The product is a dark brown solid wax soluble in butanol and mineral spirits and of the formula XMnOAl(X)OMnX wherein X is stearate.

EXAMPLE 25

Heat 22 g. of crystalline zinc acetate with 3.9 g. of aluminum hydroxide and 5 g. of water. Add 28 g. of tall oil fatty acids thereto at 130° C. and an additional 14 g. thereof at 180° C. Apply a vacuum. Add 10 g. of water slowly to the resultant. Then heat the obtained batch to 200° C. and distill in vacuo to obtain a clear oil which dries to a clear film after addition of 0.5 g. of cobalt drier. The product is of the formula TZnOAl(T)OZnT, wherein T is the residue of tall oil fatty acids.

EXAMPLE 26

Heat 14.8 g. of aluminum acetate-formate

[HCOOAl(OH)OOCCH₃] 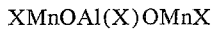

together with 11.6 g. of magnesium hydroxide and 50 g. water. After 5 g. of water has been distilled off, add 53 g. of stearic acid and 30 g. of mineral spirits to the resultant and continue heating to 180° C., at which temperature the batch becomes clear. While maintaining the temperature, add 10 g. of water slowly to said batch. Heat further to 200° C. and apply a vacuum at the latter temperature. The compound of the formula $(XMgO)_2AlOAl(OMgX)_2$ is thus obtained [X is stearate].

EXAMPLE 27

Heat 7.2 g. of aluminum acetate-formate with 14 g. of isostearic acid and 20 g. of mineral spirits to 180° C. while maintaining that temperature, add thereto 15 g. of water. Raise the temperature to 220° C. under vacuum. The resulting compound is of the formula $(OAlX)_3$, wherein X is isostearate.

EXAMPLE 28

Distil a mixture of 24.7 g. of chromium acetate, 15 g. of butanol and 35 g. of water. During distillation, add to the distill and 30 g. of butanol, 20 g. of xylene and 28 g. of isostearic acid. When the temperature of the distilland reaches 160° C., add 20 g. of Isopar M hydrocarbon solvent thereto and then apply steam distillation. Raise the temperature to 240° C., whereupon acetic acid is formed and is removed under vacuum. The product is cyclic chromium oxide isostearate $(OCrX)_n$ [$n$ is predominantly an integer from 3 to 5, primarily 3], which is a solid melting above 150° C. and soluble in xylene. Xylene solutions have a clear, bright, intense green color.

EXAMPLE 29

Heat 38 g. of ferric acetate with 26 g. of neoheptanoic acid and 30 g. of Isopar M hydrocarbon solvent to 240° C. While maintaining the batch at that temperature, add thereto 15 g. of water. Then place under 2 cm. vacuum until distillation terminates. The obtained dark brown liquid solidifies on cooling to a black solid (cyclic iron oxide heptanoate) which is soluble in equal parts by weight of a 2:1 xylene-butanol mixture.

EXAMPLE 30

Heat to 240° C. a mixture of 19.1 g. of basic iron diacetate, 29.5 g. of methyl linoleate and 10 g. of mineral spirits and maintain that temperature for 60 minutes (until foam formation ends). While maintaining the temperature, add thereto 10 g. of water. Apply a vacuum. The obtained residue is a clear brown liquid of the formula $(OFeX)_3$ [X is linoleate], which dries to a tack-free clear coating upon addition thereto of 0.1 percent (by weight) of cobalt naphthenate.

EXAMPLE 31

Dissolve 10 g. of chromic acid in 12 g. of acetic acid and 5 g. of water. Add 13 g. of zinc dust to the resulting solution. A reaction proceeds, as is reflected by a color change from orange-yellow to bright green. Add 84 g. of tall oil fatty acids to the resultant and heat same to 220° C. While maintaining that temperature, add 15 g. of water thereto followed by 5 g. of butanol and then apply a vacuum. The product is the compound of the formula XZnOCr(X)OZnX [X is the residue of tall oil fatty acids] which, when dissolved in mineral spirits, is useful as a preservative stain for wood.

EXAMPLE 32

Stir a mixture of 20 g. of chromium trioxide, 10 g. of water and 25 g. of acetic acid until a clear solution is obtained. Add 10 g. of butanol to reduce $CrO_3$ to chromic oxide $(Cr_2O_3)$. Add 56 g. of isostearic acid to the solution before raising the temperature thereof gradually to 250° C. Water and acetic acid are distilled off. While maintaining the batch at said temperature, add thereto 20 g. of water, followed by 20 g. of butanol and another 20 g. of water. Then apply a vacuum of 2 inches at the same temperature until distillation ceases (at least 10 minutes). The product is a green solid which is soluble in butanol, xylene and mineral spirits. Solutions in any of these solvents dry to a smooth, high gloss, bright green, transparent coating. Said product is chromic oxide isostearate, predominantly or entirely in cyclic form, i.e. of the formula $(OCrX)_n$, wherein X is isostearate. 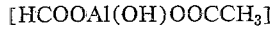

Cyclic chromic oxide isostearate is alternatively mixed with linseed oil and alkyd resin to form useful protective coatings.

EXAMPLE 33

To 5 g. of CrO₃ in 10 g. of water add 36.8 g. of manganese acetate and 56 g. of isostearate acid. Heat the resultant gradually to 250° C. Water and acetic acid are distilled off. While maintaining the batch at said temperature (at least 60 minutes), add 20 g. of water thereto. Then apply a vacuum of 2 inches at the same temperature until distillation ceases (at least 10 minutes). The product is a deep brown non-drying liquid which, when mixed with alkyd resin, is useful for producing high-gloss transparent coatings.

The product is of the formula

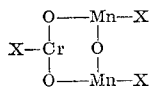

wherein X is isostearate.

EXAMPLE 34

Stir a mixture of 20 g. of CrO₃, 10 g. of water, 25 g. of acetic acid and (after reduction with 10 g. of butanol) 32.4 g. of zinc oxide. Add thereto 119 g. of tall oil fatty acids before raising the temperature thereof gradually to 270° C. Water and acetic acid are distilled off. While maintaining the batch at said temperature (at least 60 minutes), add 20 g. of water thereto. Then apply a vacuum of 2 inches at the same temperature until distillation ceases (at least 10 minutes). The product is bright green and is soluble in xylene. It is predominantly of the formula (TZnO)₂CrOCr(OZnT)₂, but may contain some of the compound of the formula TZnOCr(T)OZnT, wherein T is the residue of tall oil fatty acids. Xylene solutions of the product dry to clear coatings which are useful as wood preservatives and anticorrosives.

EXAMPLE 35

To 5 g. of CrO₃ in 10 g. of water add 37.3 g. of cobalt acetate and 56 g. of tall oil fatty acids. Heat the resultant gradually to 250° C. Water and acetic acid are distilled off. While maintaining the batch at said temperature (at least 60 minutes), add 20 g. of water thereto. Then apply a vacuum of 2 inches at the same temperature until distillation ceases (at least 10 minutes). The product is dark greyish blue and has the formula

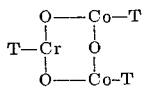

wherein T is the residue of tall oil fatty acids.

EXAMPLE 36

Disperse 2.7 g. of aluminum powder and 16.2 g. of zinc oxide in 30 g. of mineral spirits. Add thereto a mixture of 12 g. of acetic acid and 56 g. of tall oil fatty acids. Heat the resultant. (The batch thickens at 40° C., but melts again at 60° C.). Raise the temperature to 160° C. and reflux at that temperature for 60 minutes. Then distill off volatile components as the temperature is increased to 260° C. While maintaining the latter temperature, add 15 g. of water to the distilland. Thereafter subject the resultant to a vacuum at the same temperature. The product is of the formula (TZnO)₂AlOAl(OZnT)₂, wherein T is tre residue of tall oil fatty acids.

In general any di- or trivalent metal compound reactable with acetic or formic acid can be used in the process illustrated by Examples 14, 15 and 23 to 36. Even minerals, such as metal carbonates, oxides, hydroxides and sulfides, are suited for said process. When both di- and trivalent metals are used to produce a single product, the molar ratio of di- to trivalent metals should be in the range of approximately 2:1.

EXAMPLE 37

Mix 24.7 g. of crystalline chromium triacetate with 16.2 g. of zinc oxide and add 80 grams of water to the resulting admixture. Heat said admixture at 100° C. for 30 minutes, during which time the color thereof changes to dark green. Then add thereto 56 g. of tall oil fatty acids and 45 g. of mineral spirits. Heat to 220° C. While maintaining this temperature, add 20 g. of water to the resultant and then apply a vacuum. The clear green product dissolves in mineral spirits and dries with 0.5 percent by weight cobalt drier) to a high-gloss clear coating. Said product is of the formula (TZnO)₂CrOCr(OZnT)₂ and may also be used in the same manner as the product of Example 34.

EXAMPLE 38

Heat to 100° C. a mixture of 9.5 g. of basic iron acetate and 33.5 g. of lead oxide with 35 g. of water, and maintain at said temperature for 5 minutes. Add 42 g. of isostearic acid to the resultant and continue distillation. Add 40 g. of mineral spirits gradually to the distalland and raise the temperature to 200° C. While maintaining the latter temperature, add 10 g. of water to the distilland and then apply a vacuum thereto. The distilland is a dark brown liquid which solidifies on cooling. The product is of the formula (XPbO)₃Fe, wherein X is isostearate.

EXAMPLE 39

Dissolve 120 g. of rosin (acid value=300) in 40 g. of mineral spirits and 20 g. of acetic acid. Heat the obtained solution to 90° C., and add 32.4 g. of zinc oxide thereto at that temperature. Then heat further to 190° C. before dropping 25 cubic centimeters (cc.) of water slowly thereinto, followed by 15 g. of butanol and 20 g. of mineral spirits to keep the batch liquid (200° to 320° C.). [The smell of butyl acetate is noticeable in the distillate.] Apply a one-inch vacuum at 200° C. The product (M.P. 150° C.) dissolves in 50 g. of xylene to yield a resinous solution having a zinc content of 16.5 percent (by weight) based on the total solids.

EXAMPLE 40

Add 111.5 of litharge to a mixture of 74.2 g. of ethylhexoic acid, 70 g. of acetic acid and 20 g. of mineral spirits. Heat the resultant until a clear solution is obtained (150° C.). At a temperature between 160° and 210° C. add 50 g. of butanol to the solution, and maintain in the temperature range for 60 minutes while butyl acetate is slowly distilled off. Apply a vacuum thereafter to obtain 185 g. of clear colorless sirupy liquid which is useful as primer for coatings.

Whenever a vacuum is applied throughout the examples, 5 mm. Hg are employed unless there is an indication to the contrary.

Although aluminum has been used in the examples as illustrative of the general operability of the process of this invention a preferred class of MOA is that which does not include aluminum among the trivalent metals, aluminum having the lowest atomic weight among the disclosed trivalent metals.

What is claimed is:

1. In a process for preparing a metal oxide acylate of a non-volatile monocarboxylic acid as defined herein by reacting
   (I) at least one metal reactant other than aluminum, with a valence of at least two, selected from the group consisting of
      (a) a metal, a metal oxide, a metal hydroxide and a metal carbonate in admixture with a volatile monocarboxylic acid containing up to five carbon atoms and
      (b) an acylate of said metal with said volatile monocarboxylic acid with
   (II) a non-volatile monocarboxylic acid containing at least seven carbon atoms,
by heating said reactants at distillation temperatures between about 100 and 270° C., with the distilling off of said volatile carboxylic acid, the improvement comprising adding to the reaction mass, a liberating agent for the volatile monocarboxylic acid, selected from the group consisting of water, steam and a monohydric alcohol containing up to four carbon atoms, during said distillation in amounts sufficient to produce a distillate in which the volatile carboxylic acid is substantially no longer noticeable.

2. The process according to laim 1 wherein the metal reactant is one other than lead and zinc and the acylate of the metal oxide acylate is entirely that of the non-volatile monocarboxylic acid.

3. A process according to claim 1 wherein the liberating agent is either water or steam.

4. A process according to claim 3 wherein the amount of water or steam is sufficient to produce distillate in which the volatile carboxylic acid is no longer noticeable.

5. A process according to claim 4 wherein each metal element has a valence number of two.

6. A process according to claim 4 wherein each metal element has a valence number of three.

7. A process according to claim 4 wherein each metal element has a valence number of four.

8. A process according to claim 4 wherein a plurality of metal elements are reacted and two of the metal elements differ in their respective valence numbers.

9. A process according to claim 1 wherein the liberating agent is a volatile alcohol.

10. A process according to claim 9 wherein the volatile alcohol is butanol.

11. A process according to claim 9 wherein the volatile alcohol is isopropanol.

12. A process according to claim 1 wherein the liberating agent comprises both volatile alkanol and water or steam.

References Cited

UNITED STATES PATENTS

| | | | |
|---|---|---|---|
| 3,032,570 | 5/1962 | Haslam | 260—429.5 |
| 3,054,816 | 9/1962 | Rinse | 260—448 |
| 3,296,242 | 1/1967 | Turner et al. | 260—105 |
| 3,419,587 | 12/1968 | Harson | 260—414 |
| 3,422,125 | 1/1969 | Silver et al. | 260—414 |
| 3,458,552 | 7/1969 | Hauck et al. | 260—448 |
| 3,461,146 | 8/1969 | Turner et al. | 260—414 |

TOBIAS E. LEVOW, Primary Examiner

A. P. DEMERS, Assistant Examiner

U.S. Cl. X.R.

106—290; 260—97.5, 413, 414, 429.2, 429.3, 429.5, 429.7, 429.9, 431, 432, 435, 438.5, 446, 447, 448, 526